G. R. WALKER.
SPRAYER.
APPLICATION FILED MAY 4, 1912.

1,069,306.

Patented Aug. 5, 1913.
3 SHEETS—SHEET 1.

WITNESSES
Samuel Payne

INVENTOR
G. R. Walker.
BY
ATTORNEYS

G. R. WALKER.
SPRAYER.
APPLICATION FILED MAY 4, 1912.
1,069,306.
Patented Aug. 5, 1913.
3 SHEETS—SHEET 2.
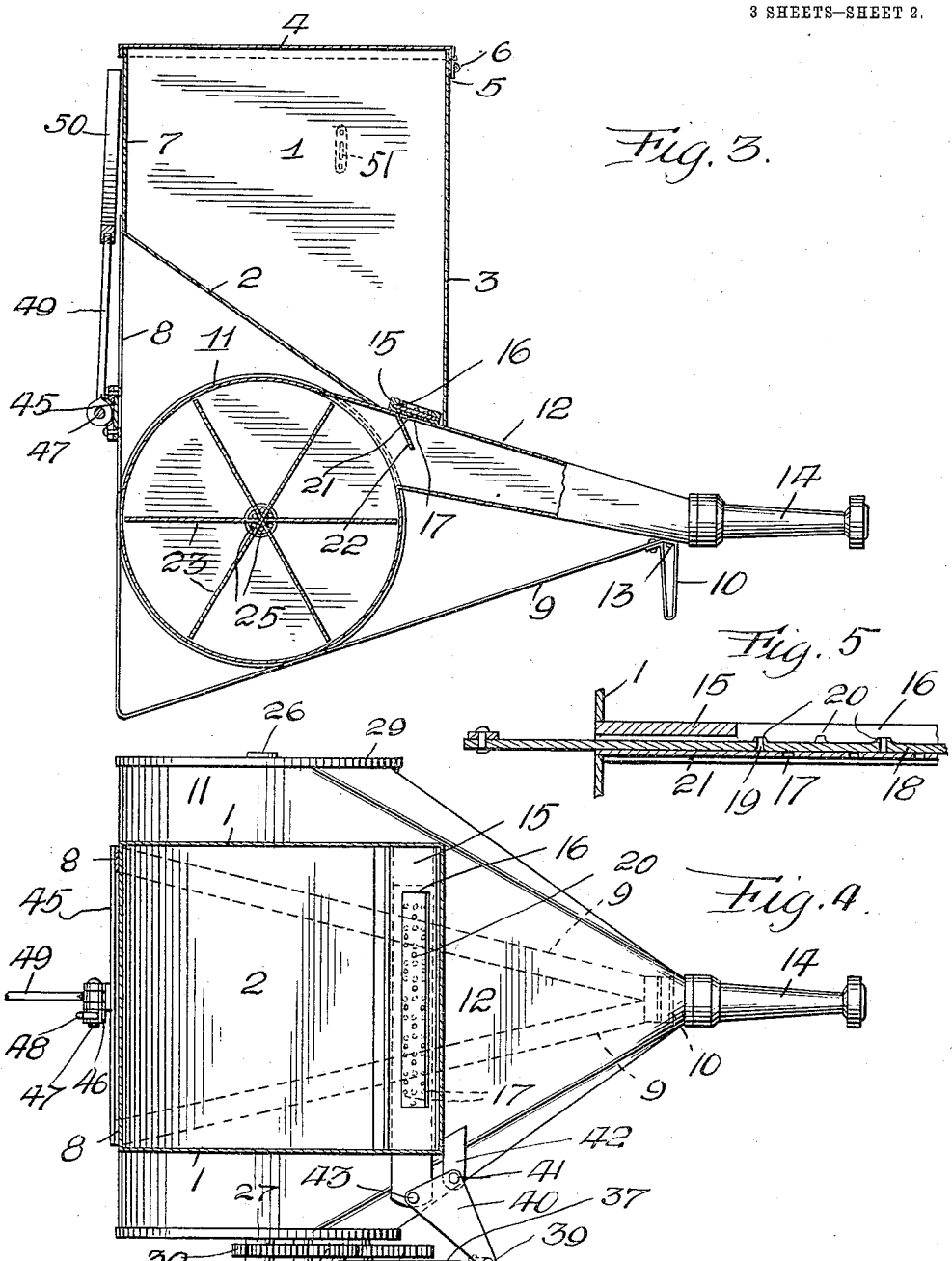
WITNESSES
Samuel Payne
J. P. Appleman
INVENTOR
G. R. Walker.
BY
ATTORNEYS G. R. WALKER.
SPRAYER.
APPLICATION FILED MAY 4, 1912.
1,069,306.
Patented Aug. 5, 1913.
3 SHEETS—SHEET 3.
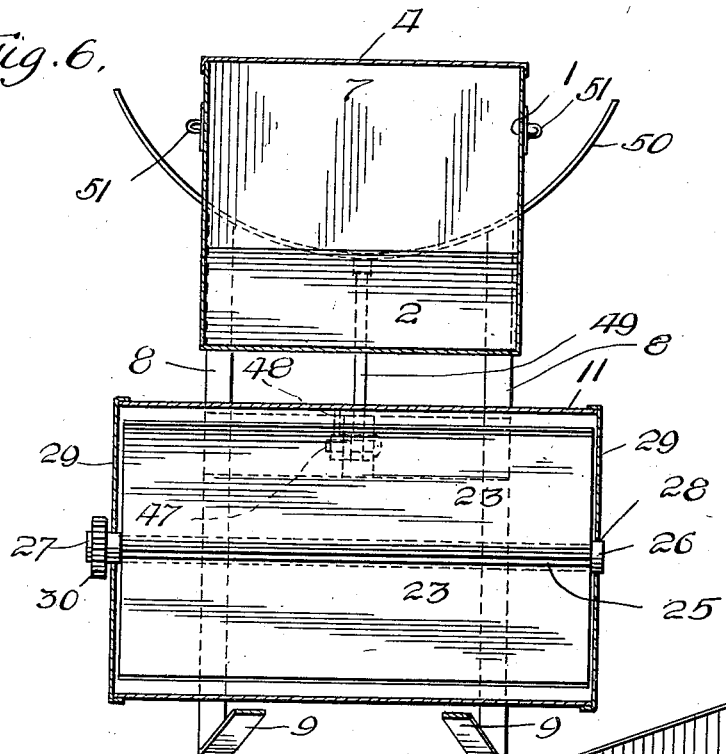
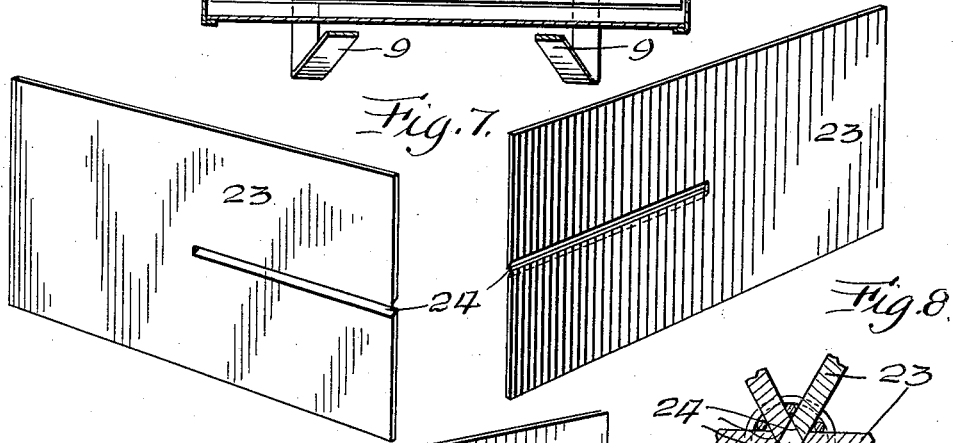
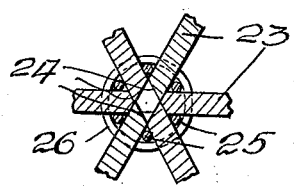
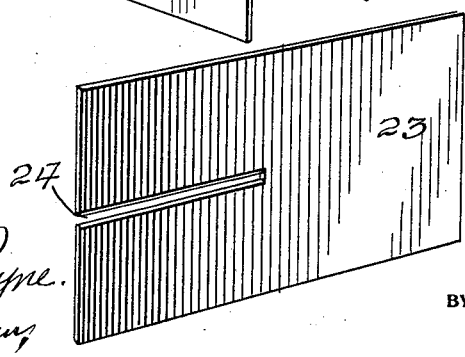
WITNESSES
INVENTOR
G. R. Walker.
BY
ATTORNEYS

UNITED STATES PATENT OFFICE.

GEORGE R. WALKER, OF ROANOKE, VIRGINIA.

SPRAYER.

1,069,306.  Specification of Letters Patent.  Patented Aug. 5, 1913.

Application filed May 4, 1912. Serial No. 695,115.

*To all whom it may concern:*

Be it known that I, GEORGE R. WALKER, a citizen of the United States of America, residing at Roanoke, in the county of Roanoke and State of Virginia, have invented certain new and useful Improvements in Sprayers, of which the following is a specification, reference being had therein to the accompanying drawing.

This invention relates to a sprayer and more particularly to that type of sprayer employed for spraying powder upon shrubbery and trees to destroy insects and fungous growth that is detrimental to the propagation of shrubbery and trees.

The object of this invention is to provide a portable spraying device with simple and effective means for agitating and equally distributing the powder in the spout of a blower that disseminates the powder whereby it can settle upon the leaves or other parts of plants.

A further object of this invention is to provide a spraying device of the above type that is inexpensive to manufacture, durable, and highly efficient for the purposes for which it is intended.

With the above and other objects in view, the invention resides in the novel construction, combination and arrangement of parts to be hereinafter specifically described and then claimed.

Reference will now be had to the drawings, wherein like numerals denote corresponding parts throughout the several views, in which:—

Figure 1:
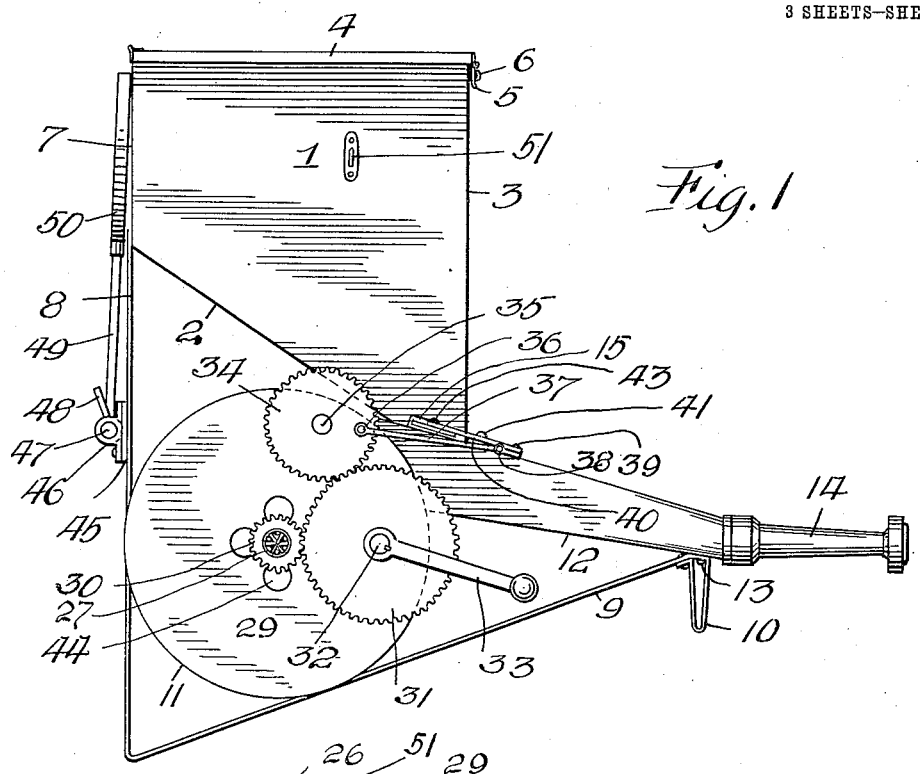
Figure 2:
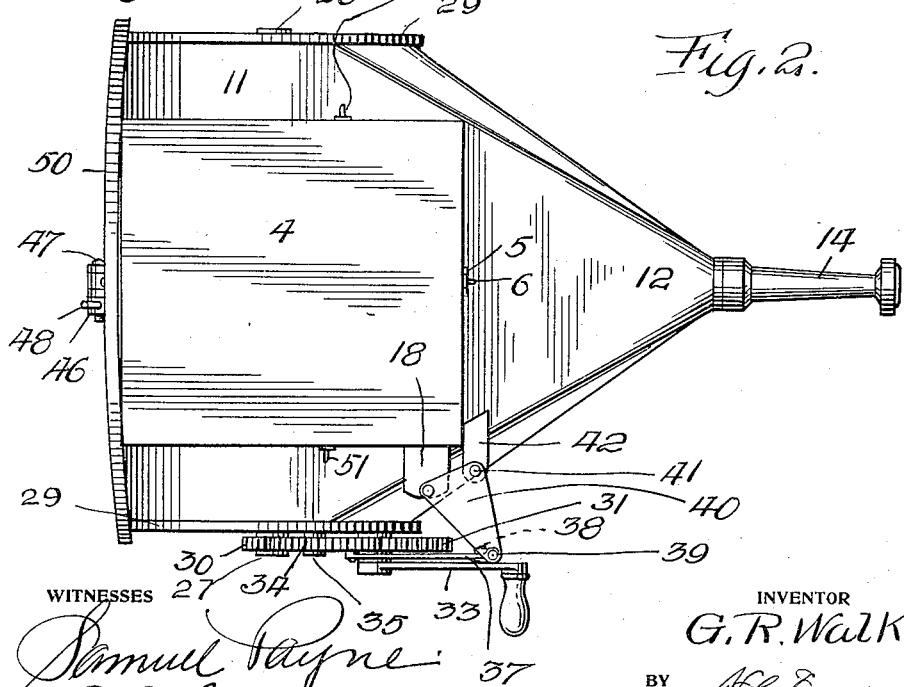

Figure 1 is a side elevation of the spraying device, Fig. 2 is a plan of the same, Fig. 3 is a vertical sectional view of the spraying device, Fig. 4 is a horizontal sectional view of the same, Fig. 5 is an enlarged detail sectional view of a combined slide and agitator forming part of the device, Fig. 6 is a longitudinal sectional view of the device, Fig. 7 illustrates perspective views of blades adapted to form part of the blower or fan, and Fig. 8 is an enlarged cross sectional view of a portion of the blower or fan.

The reference numeral 1 denotes a box or container preferably made of sheet metal, the box being rectangular in plan and having an inclined bottom plate 2 that feeds the contents of the box toward the front wall 3 thereof. The box has a hinged lid 4 that is retained in a closed position by a hasp 5 and a staple 6, or other fastening means. Connected to the rear wall 7 of the box 1, adjacent to the side walls thereof, are vertical parallel straps 8 that have the lower ends thereof bent forwardly at an angle, as at 9, said forward ends converging to a leg 10. The straps 8 are preferably made of a single piece of material, the body of the material forming the leg 10 and the body of the material being bifurcated to provide the straps. The straps constitute angle brackets and supported by said brackets is a drum 11 having a tapering spout 12 to which the leg 10 is riveted or otherwise connected, as at 13. The drum 11 is of a greater length than the box 1, the ends of the drum protruding beyond the side walls of the box, and the spout 12 is disposed tangentially relatively to the periphery of the drum.

Connected to the outer end of the spout 12 is a nozzle 14 of the ordinary and well known type employed for producing a spray or dissemination of matter projected into the spout.

The top of the spout 12 coöperates with the inclined bottom plate 2 in forming the bottom of the box 1, and the top of the spout has a casing 15 within the box. The casing 15 corresponds in length to said box and the top of said casing has an oblong opening 16, while the bottom thereof is provided with apertures 17. One end of the casing is open and slidably mounted therein is a slide 18 that is provided with openings 19. The openings 19 are adapted to register with the apertures 17 and said openings are formed by piercing or punching the slide 18 from the under side thereof, whereby the pierced or punched material will extend upwardly, as at 20 and serve as agitators for agitating and commingling the contents of the box 1.

The spout 12 is cut to provide an opening 21 in communication with the apertured or perforated bottom of the casing 15, and the cut material is bent downwardly into the spout to provide a deflector 22.

Revolubly mounted in the drum 11 is a bladed wheel consisting of interlocked blades 23. The blades 23 are slitted, as at 24 whereby the blades can be placed together in the manner shown in Fig. 8. The slits 24 are approximately half the length of the blades and intermediate the longitudinal edges thereof, said slits providing clearance for solid portions of the blades when interlocked. To equally space the blades apart, rigid wires 25 are interposed between the blades and the ends of the wires protruding beyond the blades are held by sleeves 26 and 27 rotatably mounted in openings 28 provided therefor in the detachable heads 29 of the drum 11. Mounted upon the sleeve 27 is a small gear wheel 30 meshing with a large gear wheel 31 mounted upon a shaft 32 journaled in one of the detachable heads 29 of the drum 11. The outer end of the shaft 32 has a crank 33 whereby said shaft can be revolved to impart a rotary movement to the bladed fan. The large gear wheel 31 meshes with another gear wheel 34 mounted upon a shaft 35, journaled in the head 29 of the drum 11. The outer side of the gear wheel 34 has a wrist pin 36 upon which is loosely mounted the end of a pitman 37. The pitman 37 has a coupling or pivoted link 38 that is pivotally connected, as at 39 to a triangular-shaped member 40. The member 40 is pivotally mounted, as at 41 upon a bracket 42 carried by the spout 12 and said member is pivotally connected, as at 43 to the end of the slide 18.

One of the heads 29 of the drum 11 has openings 44 to admit air to the drum.

The vertical parallel straps 8 are connected by a plate 45 and said plate intermediate the ends thereof is provided with a bearing 46. Adjustably held in engagement with the bearing 46 by a screw 47 and a nut 48 is an arm 49, said arm having the end thereof provided with a curved breast bar 50. The arm 49 can be swung at right angles to the spraying device, and the breast bar 50 placed against the breast or body to facilitate carrying the spraying device. To further assist in supporting the device, the side walls of the box 1 are provided with hooks or clasp members 51 to which can be connected a strap (not shown), whereby the box can be suspended from the shoulders in front of the body.

Assuming that powder, as Paris green, has been placed in the box 1, it is only necessary for the operator to revolve the train of gear wheels to place the blower and the slide in motion. As the slide 18 is reciprocated within the casing 15, the powder is precipitated into the spout 12 and the draft produced by the blower immediately discharges the powder from the nozzle 14.

When the device is not in use, the breast bar is folded to the position shown in Figs. 1 and 2 and the leg 10 of the box supports the device upon a surface without the end of the nozzle touching the surface, thereby preventing the nozzle from being injured or the spout distorted.

The spraying device in its entirety can be made of light and durable metal, and while in the drawing there is illustrated a preferred embodiment of the invention, it is to be understood that the structural elements are susceptible to such variations as fall within the scope of the appended claim.

What I claim is:—

A sprayer comprising a receptacle provided with an outlet opening, a perforated feed slide arranged within said receptacle movably mounted over said opening and projecting from one side of said receptacle, a blower casing supported below the receptacle, a spout projecting from the blower casing and in communication with said opening, a spraying nozzle projecting from the spout, a fan rotatably mounted within said blower casing, a hand operated gear wheel mounted in one end of said blower casing and operatively engaging with said fan for rotating it, a gear wheel journaled in one end of the casing and meshing with the first mentioned gear wheel, a bracket projecting from said receptacle, a triangular-shaped member pivotally connected to said slide and to said bracket, and means operative between the last mentioned gear wheel and said member for reciprocating the slide when said fan is operated.

In testimony whereof I affix my signature in the presence of two witnesses.

GEORGE R. WALKER.

Witnesses:
MAX H. SROLOVITZ,
K. H. BUTLER.

---

Copies of this patent may be obtained for five cents each, by addressing the "Commissioner of Patents, Washington, D. C."